United States Patent
Iwasaki

(10) Patent No.: US 11,364,912 B2
(45) Date of Patent: Jun. 21, 2022

(54) VEHICLE CONTROL DEVICE

(71) Applicant: HONDA MOTOR CO., LTD., Tokyo (JP)

(72) Inventor: Shun Iwasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 16/811,386

(22) Filed: Mar. 6, 2020

(65) Prior Publication Data

US 2020/0282992 A1 Sep. 10, 2020

(30) Foreign Application Priority Data

Mar. 8, 2019 (JP) .............................. JP2019-042113

(51) Int. Cl.
*B60W 30/18* (2012.01)
*B60W 50/14* (2020.01)

(52) U.S. Cl.
CPC .......... *B60W 30/181* (2013.01); *B60W 50/14* (2013.01); *B60W 2555/60* (2020.02)

(58) Field of Classification Search
CPC ............... B60W 30/181; B60W 50/14; B60W 2555/60; B60W 30/18154; B60W 2420/42
See application file for complete search history.

(56) References Cited

U.S. PATENT DOCUMENTS 9,896,106 B1 * 2/2018 Wrobel .................. B60W 50/14
10,640,111 B1 * 5/2020 Gutmann ........... B60W 60/0015
10,643,084 B2 * 5/2020 Qin ....................... G06K 9/6215
2013/0110316 A1 * 5/2013 Ogawa ............. G08G 1/096725
701/1
2013/0253754 A1 * 9/2013 Ferguson ........... G06K 9/00825
701/28
2014/0046509 A1 * 2/2014 Otake .............. G08G 1/096775
701/2

(Continued)

FOREIGN PATENT DOCUMENTS

JP 2004-301833 A 10/2004
JP 2016-112984 A 6/2016

OTHER PUBLICATIONS

Office Action dated Apr. 12, 2022 issued over the corresponding Japanese Patent Application No. 2019-042113 with the English translation thereof.

*Primary Examiner* — Sze-Hon Kong
*Assistant Examiner* — Tanya C Sienko
(74) *Attorney, Agent, or Firm* — Carrier Blackman Associates, P.C.; Joseph P. Carrier; Jeffrey T. Gedeon

(57) ABSTRACT

If an external environment recognition unit recognizes a traffic signal indicating a stop instruction at a point in time when a distance detection unit detects a distance less than or equal to a first distance, an operation determination unit performs deceleration control at a first rate of deceleration at a point in time when the distance detection unit detects a distance less than or equal to a second distance shorter than the first distance, and if the external environment recognition unit does not recognize the traffic signal at the point in time when the distance detection unit detects the distance less than or equal to the first distance, the operation determination unit performs the deceleration control at a second rate of deceleration smaller than the first rate of deceleration at the point in time when the distance detection unit detects the distance less than or equal to the first distance.

9 Claims, 8 Drawing Sheets

(56) References Cited

U.S. PATENT DOCUMENTS

| | | | |
|---|---|---|---|
| 2015/0151725 A1* | 6/2015 | Clarke | B60W 10/18 |
| | | | 701/28 |
| 2016/0035223 A1* | 2/2016 | Gutmann | G08G 1/09626 |
| | | | 340/907 |
| 2017/0221366 A1* | 8/2017 | An | G08G 1/096783 |
| 2018/0057001 A1* | 3/2018 | Hu | B60W 40/04 |
| 2018/0061230 A1* | 3/2018 | Madigan | B60W 60/0011 |
| 2018/0253968 A1* | 9/2018 | Yalla | G08G 1/097 |
| 2019/0137287 A1* | 5/2019 | Pazhayampallil | G05D 1/0291 |
| 2020/0001779 A1* | 1/2020 | Alexander | G08G 1/0133 |
| 2020/0130662 A1* | 4/2020 | Buerkle | B60T 7/12 |
| 2020/0238996 A1* | 7/2020 | Pendleton | B60W 30/18159 |
| 2020/0302196 A1* | 9/2020 | Wellington | G06V 20/584 |
| 2021/0094577 A1* | 4/2021 | Shalev-Shwartz | G06V 20/58 |

* cited by examiner

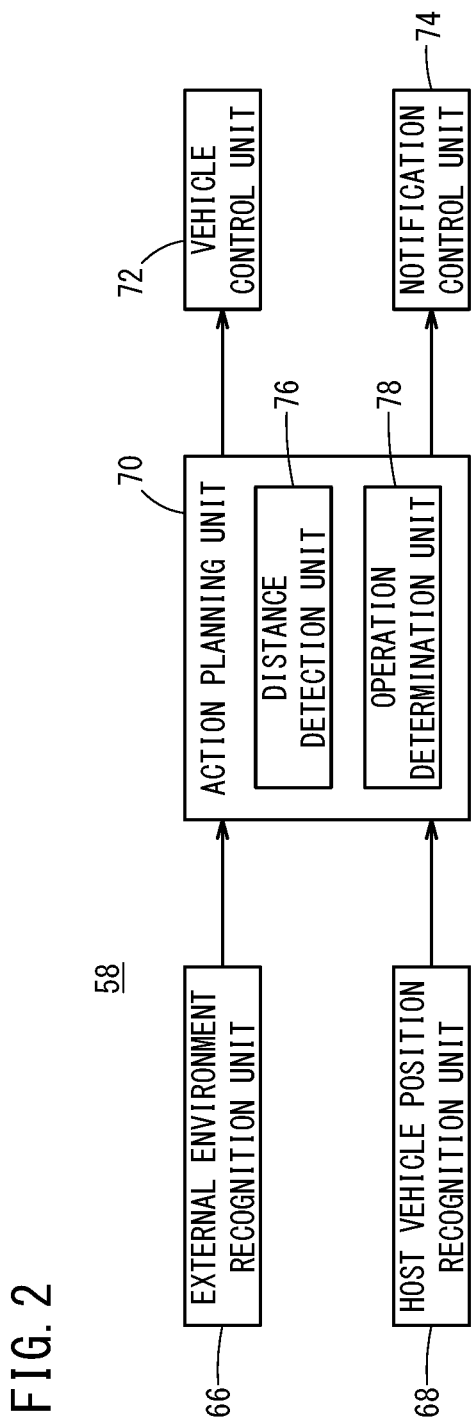

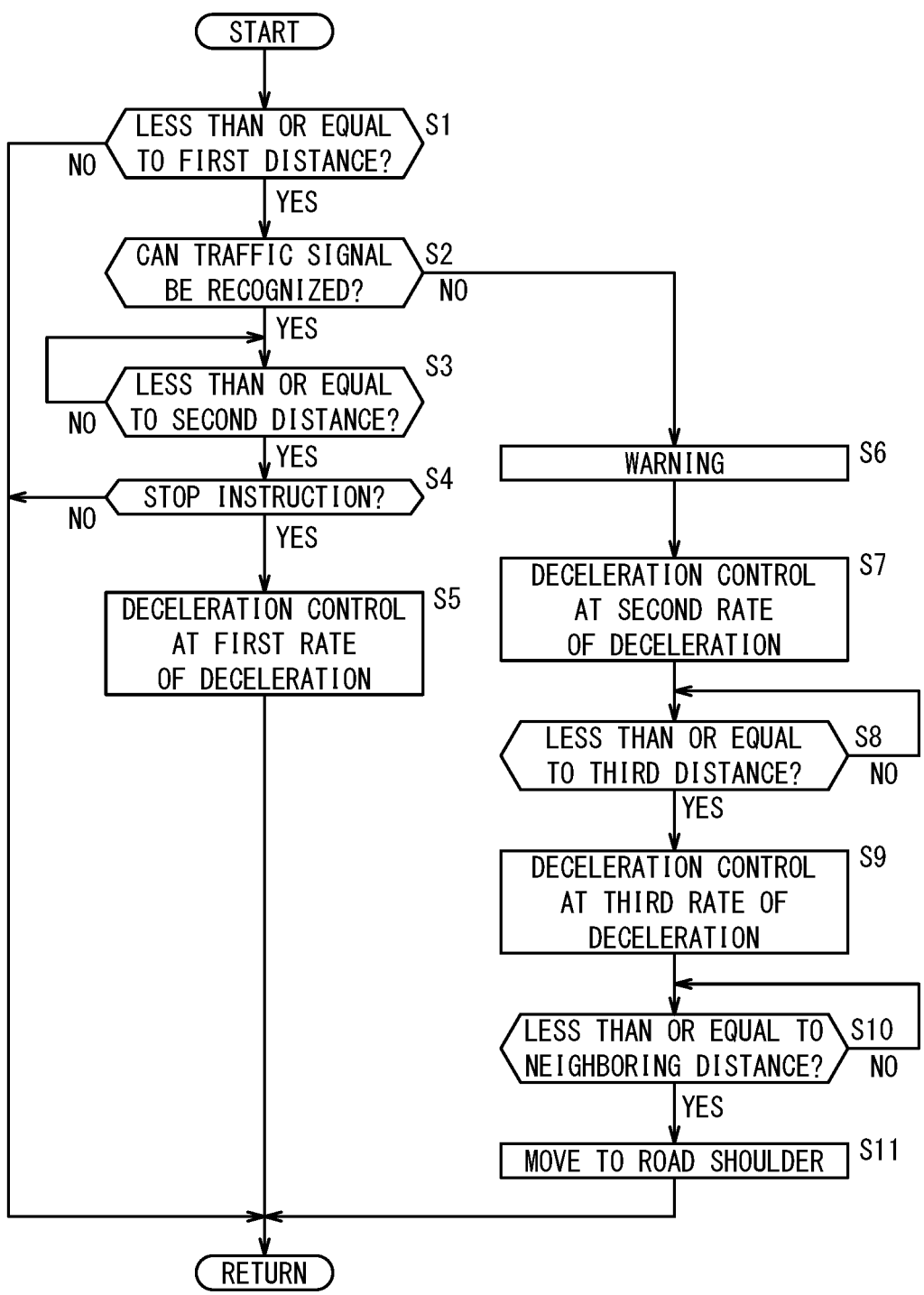

VEHICLE CONTROL DEVICE

CROSS-REFERENCE TO RELATED APPLICATION

This application is based upon and claims the benefit of priority from Japanese Patent Application No. 2019-042113 filed on Mar. 8, 2019, the contents of which are incorporated herein by reference.

BACKGROUND OF THE INVENTION

Field of the Invention

The present invention relates to a vehicle control device which is capable of automatically performing at least one of a driving force output control, a braking control, and a steering control of a host vehicle.

Description of the Related Art

In Japanese Laid-Open Patent Publication No. 2004-301833, an inter-vehicle distance control apparatus is disclosed in which a driver is capable of visually recognizing a traffic signal device which is in front of a host vehicle (driver's own vehicle), by performing a control such as setting a target inter-vehicle distance to become larger as the height of a preceding vehicle is higher.

SUMMARY OF THE INVENTION

An automatically driven vehicle has been developed that performs autonomous traveling while recognizing external environmental information such as traffic signals or the like on the basis of information acquired by an external environment sensor such as a camera or the like. In an automatically driven vehicle as well, the higher the height of the preceding vehicle becomes, the more difficult it is to obtain information (information of traffic signals) ahead from images captured by the camera. Therefore, the technique disclosed in Japanese Laid-Open Patent Publication No. 2004-301833 is also effective in relation to an automatically driven vehicle.

However, in an automatically driven vehicle, the reason as to why a traffic signal may not be recognized is not limited to the existence of a preceding vehicle. For example, the traffic signal may not be recognized due to a device failure or bad weather. Tentatively, in the case that a traffic signal is not recognized, if the cause therefor is specified and addressed, the computational load increases.

The present invention has been devised taking into consideration the aforementioned problems, and has the object of providing a vehicle control device which is capable of allowing a vehicle to travel appropriately even in the case that a traffic signal cannot be recognized.

A vehicle control device according to a first aspect of the invention comprises:

an external environment recognition unit configured to recognize, on a basis of map information, an existence of a traffic signal device in a direction of progress of a host vehicle, and recognize a traffic signal displayed by the traffic signal device on a basis of information acquired by an external environment sensor or a communication unit;

a distance detection unit configured to detect a distance between the host vehicle and the traffic signal device;

an operation determination unit configured to determine an operation of the host vehicle on a basis of a recognition result of the external environment recognition unit and a detection result of the distance detection unit; and a vehicle control unit configured to control the host vehicle on a basis of the operation determined by the operation determination unit, wherein:

in a case that the external environment recognition unit recognizes the traffic signal indicating a stop instruction at a point in time when the distance detection unit has detected that the distance is less than or equal to a first distance, the operation determination unit performs a deceleration control at a first rate of deceleration at a point in time when the distance detection unit has detected that the distance is less than or equal to a second distance which is shorter than the first distance; and in a case that the external environment recognition unit does not recognize the traffic signal at the point in time when the distance detection unit has detected that the distance is less than or equal to the first distance, the operation determination unit performs the deceleration control at a second rate of deceleration, which is smaller than the first rate of deceleration, at the point in time when the distance detection unit has detected that the distance is less than or equal to the first distance.

A vehicle control device according to a second aspect of the invention comprises:

an external environment recognition unit configured to recognize, on a basis of map information, an existence of a traffic signal device in a direction of progress of a host vehicle, and recognize a traffic signal displayed by the traffic signal device on a basis of information acquired by an external environment sensor or a communication unit;

a distance detection unit configured to detect a distance between the host vehicle and the traffic signal device;

an operation determination unit configured to determine an operation of the host vehicle on a basis of a recognition result of the external environment recognition unit and a detection result of the distance detection unit; and a notification control unit configured to perform a notification control on a basis of the operation determined by the operation determination unit, wherein the operation determination unit causes the notification control unit to issue a warning, in a case that the external environment recognition unit does not recognize the traffic signal at a point in time when the distance detection unit has detected a predetermined distance.

According to the present invention, unrecognizable states of all kinds can be handled with a simple configuration.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a functional block diagram of a computation device;

FIG. 4 is a flowchart showing a flow of basic processes performed by the vehicle control device;

DETAILED DESCRIPTION OF THE PREFERRED EMBODIMENTS

A preferred embodiment of a vehicle control device according to the present invention will be presented and described in detail below with reference to the accompanying drawings.

1. Overview of Vehicle Control Device 10

Figure 1:
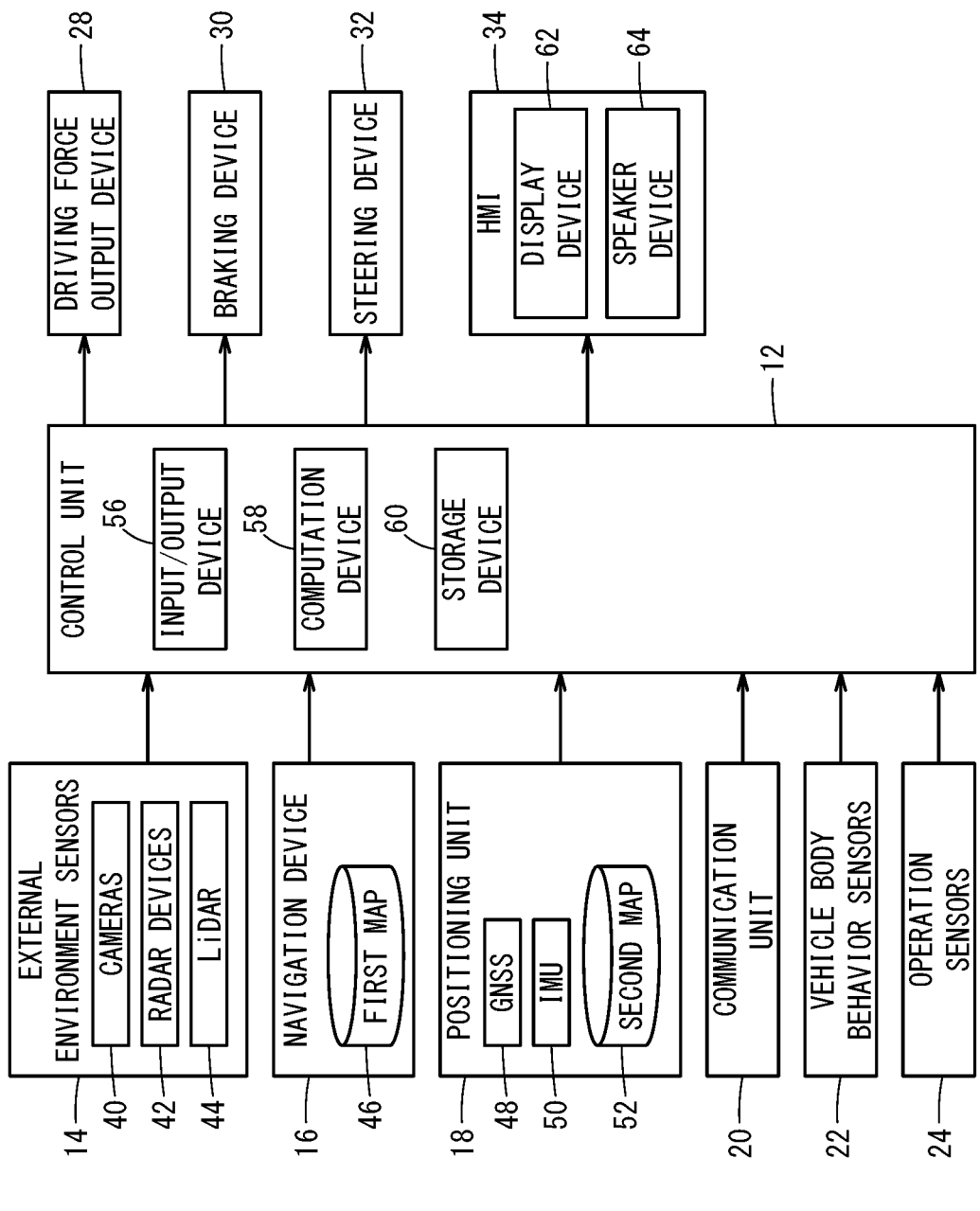
FIG. 1 is a block diagram of a vehicle control device according to a present embodiment.

The vehicle control device 10 shown in FIG. 1 is capable of switching between manual driving in which travel controls (vehicle controls of acceleration, deceleration, and steering) of a host vehicle 90 (see FIG. 3A, etc.) are performed by a vehicle occupant, and automated driving in which at least a portion of the travel controls is performed automatically.

2. Configuration of Vehicle Control Device 10

The configuration of the vehicle control device 10 will now be described with reference to FIG. 1. The vehicle control device 10 is provided in the host vehicle 90. The vehicle control device 10 includes a control unit 12, an input device group that inputs various information with respect to the control unit 12, and an output device group that operates the host vehicle 90 based on various information output from the control unit 12. Within the input device group, there are included external environment sensors 14, a navigation device 16, a positioning unit 18, a communication unit 20, vehicle body behavior sensors 22, and operation sensors 24. Within the output device group, there are included a driving force output device 28, a braking device 30, a steering device 32, and an HMI 34.

2.1. Configuration of Input Device Group

The external environment sensors 14 include one or more cameras 40, one or more radar devices 42, and one or more LiDAR devices 44. The cameras 40 capture images of the surrounding environment of the host vehicle 90, and output image information to the control unit 12. The radar devices 42 and the LiDAR devices 44 detect targets around the periphery of the host vehicle 90, and output detected information to the control unit 12.

The navigation device 16 specifies the position of the host vehicle 90 using a GPS or the like, refers to map information of a first map 46 and generates a travel route from the position of the host vehicle 90 to a destination designated by the vehicle occupant, and outputs travel route information to the control unit 12.

The positioning unit 18 outputs to the control unit 12 position information indicative of the position of the host vehicle 90 specified by a GNSS 48 and an IMU 50, and map information of a second map 52. Moreover, the second map 52 includes more accurate and detailed map information than the first map 46, and includes, for example, information such as the number of lanes included in the roads, positions of the lanes, and widths of the lanes.

The communication unit 20 includes a communication device that receives information broadcast by a broadcasting station, a communication device that receives information transmitted by roadside devices installed along the road, and a communication device that receives information transmitted by vehicles other than the host vehicle 90, and outputs the various information that are received to the control unit 12.

The vehicle body behavior sensors 22 include various sensors that measure the behavior of the host vehicle 90, for example a vehicle speed sensor that detects the travel speed of the host vehicle 90, a yaw rate sensor that detects the yaw rate of the host vehicle 90, and the like. The vehicle body behavior sensors 22 output various detected information to the control unit 12.

The operation sensors 24 include switches or sensors that detect operations performed by the user, for example, an automated driving switch to switch between automated driving and manual driving, a turn signal switch which indicates a flashing direction of the turn signals, an accelerator pedal sensor that detects an amount by which the accelerator pedal is operated, a brake pedal sensor that detects an amount by which the brake pedal is operated, a steering angle sensor that detects a steering angle of the steering wheel, and a contact sensor provided on the steering wheel. The operation sensors 24 output various detected information to the control unit 12.

2.2. Configuration of Control Unit 12

The control unit 12 is constituted by an ECU. The control unit 12 includes an input/output device 56, a computation device 58, and a storage device 60. The input/output device 56 includes an A/D conversion circuit, a communication interface, a driver, and the like. The computation device 58 is constituted by a processor equipped with a CPU or the like, for example. The computation device 58 realizes various functions by executing programs stored in the storage device 60. A description will be given in item [2.4] below concerning the various functions of the computation device 58. The storage device 60 is constituted by memories such as a RAM, a ROM, and the like. The storage device 60 stores various programs, and numerical information and the like used in processes performed by the computation device 58.

2.3. Configuration of Output Device Group

The driving force output device 28 includes a driving force output ECU and actuators (including a driving motor, a throttle valve, and the like) that serve as control targets of the driving force output ECU. The driving force output device 28 adjusts the driving force in accordance with an operation of the accelerator pedal performed by the vehicle occupant, or instruction information (driving instructions) output from the control unit 12.

The braking device 30 includes a brake ECU, and actuators (including a brake actuator and the like) that serve as control targets of the brake ECU. The braking device 30 adjusts the braking force in accordance with an operation of the brake pedal performed by the vehicle occupant, or instruction information (braking instructions) output from the control unit 12.

The steering device 32 includes an electric power steering (EPS) ECU and an actuator (including an EPS actuator or the like) that is controlled by the EPS ECU. The steering device 32 adjusts a steering amount in accordance with operations of the steering wheel performed by the vehicle occupant, or instruction information (steering instructions) output from the control unit 12.

The HMI 34 includes a display device 62 and a speaker device 64. The display device 62 outputs image information in accordance with instruction information (notification instructions) output from the control unit 12. The display device 62 may be an input device equipped with a touch panel. The speaker device 64 outputs audio information in accordance with instruction information (notification instructions) output from the control unit 12.

2.4. Various Functions of Computation Device 58

The various functions realized by the computation device 58 will be described with reference to FIG. 2. The computation device 58 functions as an external environment recognition unit 66, a host vehicle position recognition unit 68, an action planning unit 70, a vehicle control unit 72, and a notification control unit 74.

The external environment recognition unit 66 performs image processing using image information output from the cameras 40, and object recognition using detection information from the radar devices 42 and the LiDAR devices 44, and recognizes a state around the periphery of the host vehicle 90. The host vehicle position recognition unit 68 recognizes the position of the host vehicle 90 on the basis of the position information output from the navigation device 16 or the positioning unit 18, and the map information from at least one of the first map 46 and the second map 52.

The action planning unit 70 generates a local map (dynamic map) which includes static information and dynamic information around the periphery of the host vehicle 90, on the basis of the recognition results of the external environment recognition unit 66 and the host vehicle position recognition unit 68. In addition, the action planning unit 70 determines optimal actions based on the local map and the state (travel speed, steering angle, position) of the host vehicle 90, and calculates a travel speed (or a rate of acceleration/deceleration) together with generating a travel trajectory in order to realize such actions. According to the present embodiment, the action planning unit 70 functions as a distance detection unit 76 that detects the host vehicle 90 and a traffic signal device 92 (refer to FIG. 3A, etc.), and an operation determination unit 78 that determines operations of the host vehicle 90 based on the recognition result of the external environment recognition unit 66 and the detection result of the distance detection unit 76.

The vehicle control unit 72 calculates a rate of acceleration or deceleration in order for the host vehicle 90 to be operated at the travel speed calculated by the action planning unit 70, and a steering angle for causing the host vehicle 90 to travel along the travel trajectory generated by the action planning unit 70. The vehicle control unit 72 outputs instruction information to instruct the rate of acceleration/deceleration and the steering angle to the driving force output device 28, the braking device 30, and the steering device 32 via the input/output device 56.

The notification control unit 74 outputs instruction information indicative of notification content to the HMI 34 via the input/output device 56, in the case that notifications are required in accordance with the actions determined by the action planning unit 70.

3. Processes Performed by Vehicle Control Device 10

In the present embodiment, on the basis of the map information of the first map 46 or the second map 52, the external environment recognition unit 66 recognizes a closest traffic signal device 92 existing in the direction of progress of the host vehicle 90.

Figure 3A:
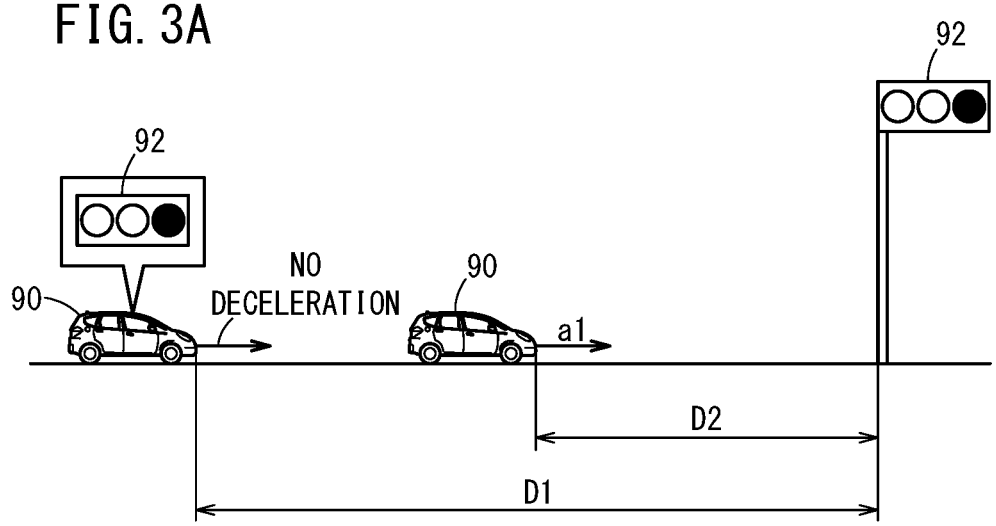
FIG. 3A is a schematic diagram illustrating a situation in which a traffic signal is recognized at a first distance.

As shown in FIG. 3A, at a point in time when the host vehicle 90 has reached a position in front of the traffic signal device 92 by a first distance D1, in the case that the external environment recognition unit 66 recognizes a traffic signal indicating a stop instruction, the host vehicle 90 continues traveling without change. In addition, at a point in time when the host vehicle 90 has reached a second distance D2 (D2<D1), the host vehicle 90 begins to decelerate at a first rate of deceleration a1.

Figure 3B:
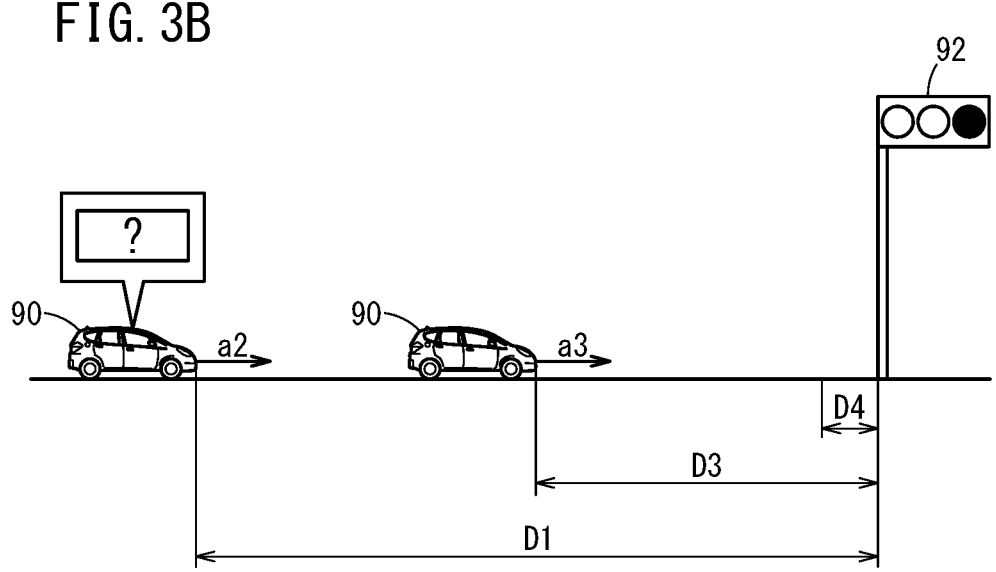
FIG. 3B is a schematic diagram illustrating a situation in which a traffic signal is not recognized at the first distance.

As shown in FIG. 3B, at a point in time when the host vehicle 90 has reached the position in front of the traffic signal device 92 by the first distance D1, in the case that the external environment recognition unit 66 does not recognize the traffic signal itself, then at that point in time, the host vehicle 90 begins to decelerate at a second rate of deceleration a2 (a2<a1). Furthermore, at a point in time when the host vehicle 90 has reached a third distance D3 (D3<D1), the host vehicle 90 begins to decelerate at a third rate of deceleration a3 (a1≤A3).

As the first distance D1, for example, a limit distance is set at which the external environment sensors 14 or the communication unit 20 can acquire traffic signal information. In the case that the external environment recognition unit 66 recognizes a traffic signal on the basis of the image information acquired by the cameras 40, then as the first distance D1, a limit distance is set at which the external environment recognition unit 66 is capable of identifying an illuminated location or display color of the traffic signal device 92. In the case that the external environment recognition unit 66 recognizes a traffic signal on the basis of signal information acquired by the communication unit 20, then as the first distance D1, a limit distance is set within a reception range of the signal information. Further, as the first distance D1, a distance (design value) may be set, which is determined based on a distance at which it is possible to stop at the first deceleration a1. However, this distance must be shorter than the limit distance at which the external environment sensors 14 or the communication unit 20 can acquire the information of the traffic signal. Further, another predetermined value may be set as the first distance D1. Further, the first distance D1 may be a variable value that varies in accordance with the travel speed of the host vehicle 90. In the case that the first distance D1 is a variable value, a limit distance is set at which the external environment sensors 14 or the communication unit 20 can acquire the information of the traffic signal.

The first to third rates of deceleration a1 to a3 are set in advance. Further, the second distance D2 and the third distance D3 are requested from a map in which the travel speed of the host vehicle 90, and the rate of deceleration (the first rate of deceleration a1 or the third rate of deceleration a3) set by the deceleration control are treated as input parameters. The map is stored in advance in the storage device 60.

3.1. Basic Processes

Figure 5:
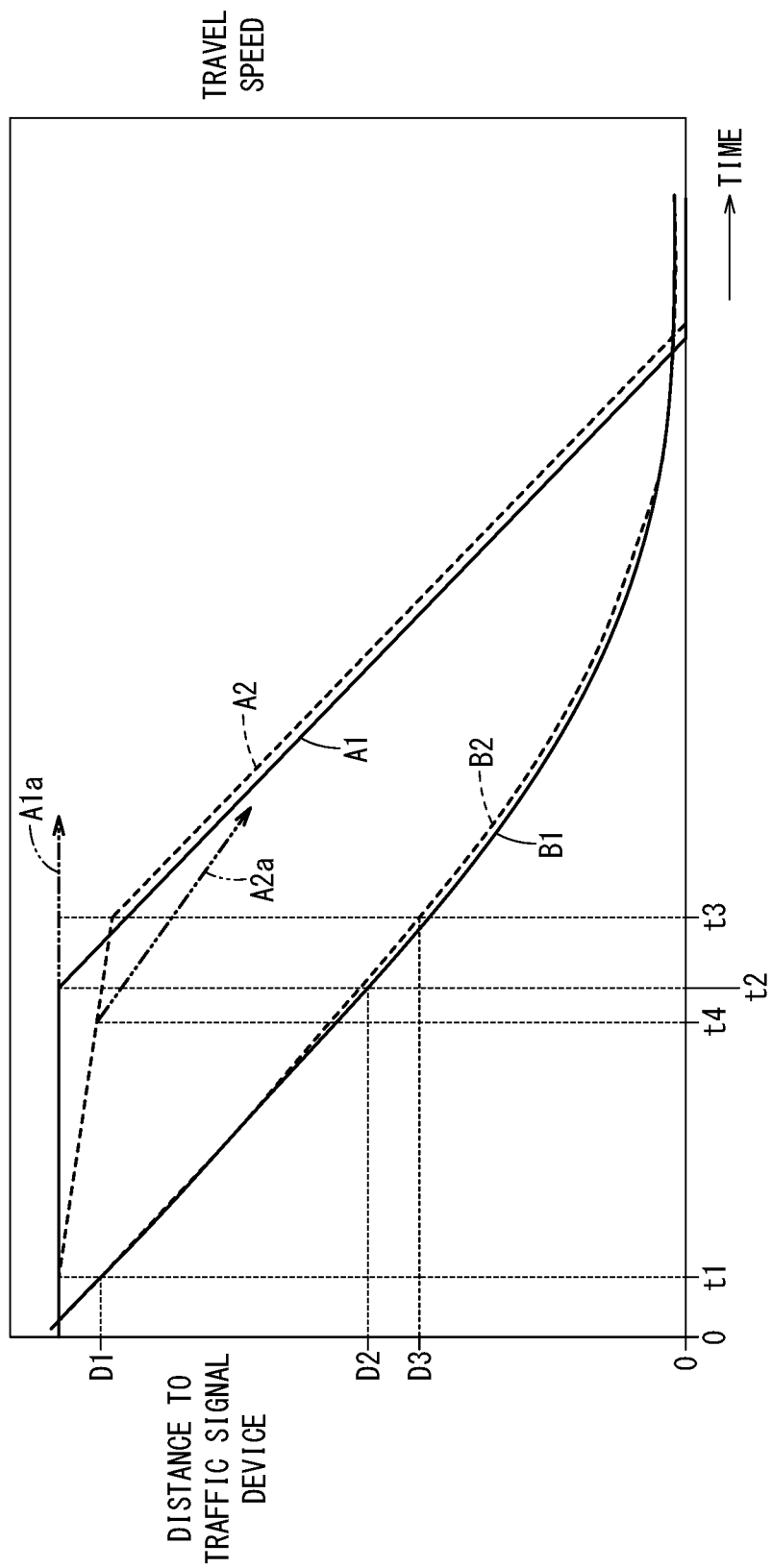
FIG. 5 is a diagram showing a transition of a distance from a host vehicle to a traffic signal device along with the passage of time, and a transition of a travel speed of the host vehicle along with the passage of time.

Processes performed by the vehicle control device 10 will be described with reference to FIGS. 4 and 5. In FIG. 5, lines A1 and A2 indicate transitions of the travel speed of the host vehicle 90 along with the passage of time, and lines B1 and B2 indicate transitions of the distance between the position of the host vehicle 90 and the position of the traffic signal device 92 along with the passage of time. Moreover, lines A1 and B1 indicate transitions in the case that the external environment recognition unit 66 recognizes the traffic signal, whereas lines A2 and B2 indicate transitions in the case that the external environment recognition unit 66 does not recognize the traffic signal.

In the processes to be described below, the distance detection unit 76 detects the distance from the position of the host vehicle 90 to the position of the traffic signal device 92, at all times or at regular intervals, for a state in which the external environment recognition unit 66 recognizes the traffic signal device 92. At this time, the distance detection unit 76 determines the position of the host vehicle 90 on the basis of position information detected by the navigation device 16 or the positioning unit 18, determines the position of the traffic signal device 92 on the basis of the map information of the first map 46 or the second map 52, or alternatively, the information acquired by the communication unit 20, and calculates the distance between both positions. Alternatively, the distance detection unit 76 determines the distance from the position of the host vehicle 90 to the position of the traffic signal device 92 on the basis of the information acquired by the external environment sensors 14. In the case that the deceleration control is automated, the series of processes to be described below are performed at each of predetermined time intervals.

In step S1, the operation determination unit 78 determines whether or not the distance detected by the distance detection unit 76 is less than or equal to the first distance D1, and more specifically, whether or not the distance between the host vehicle 90 and the traffic signal device 92 is less than or equal to the first distance D1. In the case that the distance is less than or equal to the first distance D1 (step S1: YES), the process transitions to step S2. On the other hand, in the case that the distance is greater than the first distance D1 (step S1: NO), the process is temporarily ended.

In step S2, the external environment recognition unit 66 determines whether or not a traffic signal that is displayed by the traffic signal device 92 is capable of being recognized. The external environment recognition unit 66 recognizes the traffic signal on the basis of image information acquired by the cameras 40, or recognizes the traffic signal on the basis of signal information acquired by the communication unit 20. In the case that the traffic signal can be recognized (step S2: YES), the process transitions to step S3. At this time, the operation determination unit 78 determines to perform a constant speed control, and on the basis of the determination result, the vehicle control unit 72 controls the driving force output device 28, the braking device 30, and the steering device 32. Upon doing so, as indicated by the line A1 shown in FIG. 5, the host vehicle 90 travels at a constant speed at time t1. On the other hand, if the traffic signal cannot be recognized due to any reason, such as poor visibility due to a large vehicle up ahead, a failure of the traffic signal device 92, a failure of the devices, or bad weather or the like (step S2: NO), the process transitions to step S6.

In step S3, the operation determination unit 78 determines whether or not the distance detected by the distance detection unit 76 is less than or equal to the second distance D2, and more specifically, whether or not the distance between the host vehicle 90 and the traffic signal device 92 is less than or equal to the second distance D2. In the case that the distance is less than or equal to the second distance D2 (step S3: YES), the process transitions to step S4. On the other hand, in the case that the distance is greater than the second distance D2 (step S3: NO), the process of step S3 is repeatedly executed.

In step S4, the operation determination unit 78 determines whether or not the traffic signal recognized by the external environment recognition unit 66 is displaying a stop instruction. In the case that the traffic signal is displaying a stop instruction (step S4: YES), the process transitions to step S5. On the other hand, in the case that the traffic signal permits forward traveling (step S4: NO), the process is temporarily ended. At this time, the operation determination unit 78 determines to perform a constant speed control, and on the basis of the determination result, the vehicle control unit 72 controls the driving force output device 28, the braking device 30, and the steering device 32. Upon doing so, as indicated by the dashed line A1$a$ shown in FIG. 5, the host vehicle 90 travels at a constant speed at time t2.

In step S5, the operation determination unit 78 determines to perform the deceleration control at the first rate of deceleration a1. On the basis of the determination result, the vehicle control unit 72 controls the driving force output device 28, the braking device 30, and the steering device 32. Upon doing so, as indicated by the line A1 shown in FIG. 5, the host vehicle 90 starts decelerating at time t2, and stops (travels at a zero speed) in front of (or before reaching) the traffic signal device 92. After the host vehicle 90 has stopped, the process is temporarily ended.

On the other hand, upon transitioning from step S2 to step S6, the operation determination unit 78 determines to issue a warning in order to notify the vehicle occupant that the traffic signal cannot be identified. The notification control unit 74 controls the HMI 34 on the basis of the determination result. Upon doing so, a warning message is output to the vehicle occupant from the display device 62 and the speaker device 64. The process then transitions to step S7.

In step S7, the operation determination unit 78 determines to perform the deceleration control at the second rate of deceleration a2. On the basis of the determination result, the vehicle control unit 72 controls the driving force output device 28, the braking device 30, and the steering device 32. Upon doing so, as indicated by the line A2 shown in FIG. 5, the host vehicle 90 begins decelerating at time t1. The process then transitions to step S8.

In step S8, the operation determination unit 78 determines whether or not the distance detected by the distance detection unit 76 is less than or equal to the third distance D3 (D3<D2), and more specifically, whether or not the distance between the host vehicle 90 and the traffic signal device 92 is less than or equal to the third distance D3. In the case that the distance is less than or equal to the third distance D3 (step S8: YES), the process transitions to step S9. On the other hand, in the case that the distance is greater than the third distance D3 (step S8: NO), the process of step S8 is repeatedly executed.

In step S9, the operation determination unit 78 determines to perform the deceleration control at the third rate of deceleration a3. On the basis of the determination result, the vehicle control unit 72 controls the driving force output device 28, the braking device 30, and the steering device 32. Upon doing so, as indicated by the line A2 shown in FIG. 5, the host vehicle 90 begins decelerating at time t3. In FIG. 5, the third rate of deceleration a3 has a value equivalent to that of the first rate of deceleration a1. The process then transitions to step S10.

In step S10, the operation determination unit 78 determines whether or not the distance detected by the distance detection unit 76 is less than or equal to the neighboring distance D4 (D4<D3), and more specifically, whether or not the distance between the host vehicle 90 and the traffic signal device 92 is less than or equal to the neighboring distance D4. A predetermined value is set as the neighboring distance D4, and is stored in advance in the storage device 60. In the case that the distance is less than or equal to the neighboring distance D4 (step S10: YES), the process transitions to step S11. On the other hand, in the case that the distance is greater than the neighboring distance D4 (step S10: NO), the process of step S10 is repeatedly executed.

In step S11, the operation determination unit 78 determines to perform an evacuation control to cause the host vehicle 90 to move to the road shoulder, and on the basis of a detection result thereof, the vehicle control unit 72 controls the driving force output device 28, the braking device 30, and the steering device 32. Upon doing so, the host vehicle 90 moves to the road shoulder, and as indicated by the line A2 shown in FIG. 5, the host vehicle 90 comes to a stop (a travel speed of zero) in front of the traffic signal device 92.

Steps S10 and S11 are processes for preventing the host vehicle 90 from hindering the flow of traffic, in the case that the host vehicle 90 is made to stop in spite of the fact that the traffic signal device 92 permits forward traveling. It should be noted that the operation determination unit 78 may also cause the host vehicle 90 to come to a stop in front of the traffic signal device 92 without performing the processes of step S10 and step S11.

3.2. Traffic Signal Confirmation Process

In the case that the host vehicle 90 travels by way of automated driving, the vehicle control device 10 performs a vehicle control in accordance with the most recent traffic signal. According to the present embodiment, the traffic signal confirmation processes (first confirmation process and second confirmation process) described below may be performed while the deceleration control is being executed.

Figure 6:
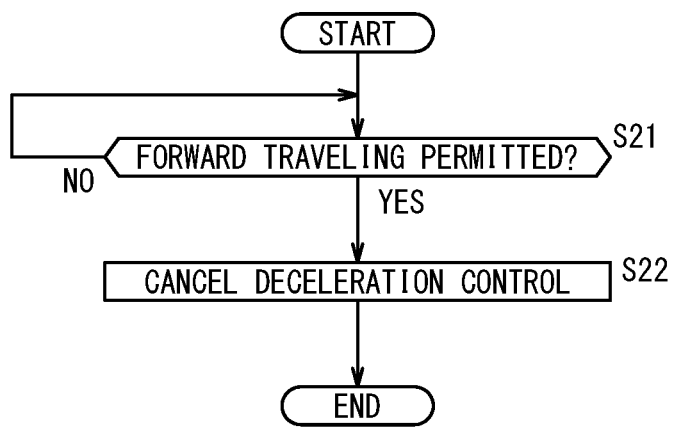
FIG. 6 is a flowchart showing a flow of a first confirmation process performed by the vehicle control device.

The first confirmation process will be described with reference to FIG. 6. The first confirmation process is performed in parallel with the deceleration control at the first rate of deceleration a1 and the deceleration control at the third rate of deceleration a3. Further, the first confirmation process is performed at each of predetermined time periods.

In step S21, the external environment recognition unit 66 determines whether or not the traffic signal permits forward traveling. In the case that the traffic signal permits forward traveling (step S21: YES), the process transitions to step S22. On the other hand, in the case that the traffic signal is displaying a stop instruction or in the case that the traffic signal is not recognized (step S21: NO), the process of step S21 is repeatedly executed.

In step S22, the operation determination unit 78 determines to cancel the deceleration control. On the basis of the determination result, the vehicle control unit 72 controls the driving force output device 28, the braking device 30, and the steering device 32. Upon doing so, the host vehicle 90 begins to accelerate. In this case, the deceleration control at the first rate of deceleration a1 or the deceleration control at the third rate of deceleration a3, which are performed in parallel, is brought to an end.

Figure 7:
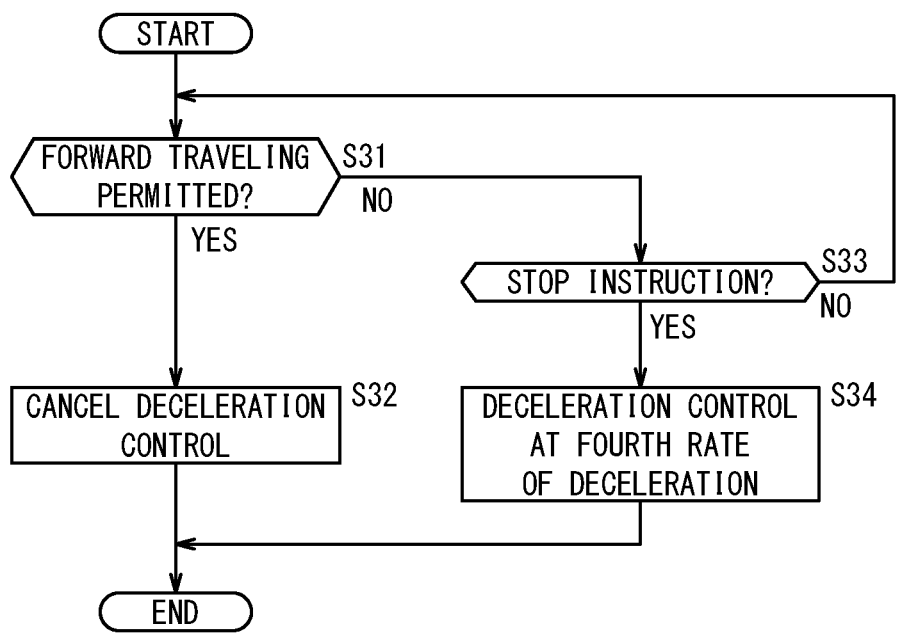
FIG. 7 is a flowchart showing a flow of a second confirmation process performed by the vehicle control device.

The second confirmation process will be described with reference to FIG. 7. The second confirmation process is performed in parallel with the deceleration control at the second rate of deceleration a2. Further, the second confirmation process is performed at each of predetermined time periods.

In step S31, the external environment recognition unit 66 determines whether or not the traffic signal permits forward traveling. In the case that the traffic signal permits forward traveling (step S31: YES), the process transitions to step S32. Since the process of step S32 is the same as the process of step S22, description thereof will be omitted. On the other hand, in the case that the traffic signal is displaying a stop instruction or in the case that the traffic signal is not recognized (step S31: NO), the process transitions to step S33.

In step S33, the external environment recognition unit 66 determines whether or not the traffic signal is displaying a stop instruction. In the case that the traffic signal is displaying a stop instruction (step S33: YES), the process transitions to step S34. On the other hand, in the case that the traffic signal is not displaying a stop instruction, or stated otherwise, in the case that the traffic signal is not recognized (step S33: NO), the process returns to step S31.

In step S34, the operation determination unit 78 determines to perform the deceleration control at the fourth rate of deceleration a4 (a2<a4≤a1). On the basis of the determination result, the vehicle control unit 72 controls the driving force output device 28, the braking device 30, and the steering device 32. Upon doing so, as indicated by the dashed line A2a in FIG. 5, the host vehicle 90 starts to decelerate at the fourth rate of deceleration a4 at time t4. Moreover, as the fourth rate of deceleration a4, a rate of deceleration is set at which the host vehicle 90 is capable of coming to a stop at the position of the traffic signal device 92, as determined from the travel speed of the host vehicle 90, and the distance between the host vehicle 90 and the traffic signal device 92. When the process of step S34 is carried out, the processes of step S8 and thereafter in FIG. 4 are not executed, and the deceleration control at the fourth rate of deceleration a4 is continued. At this time, the first confirmation process shown in FIG. 6 may be performed in parallel therewith.

4. Modifications

4.1. First Modification

Figure 8:
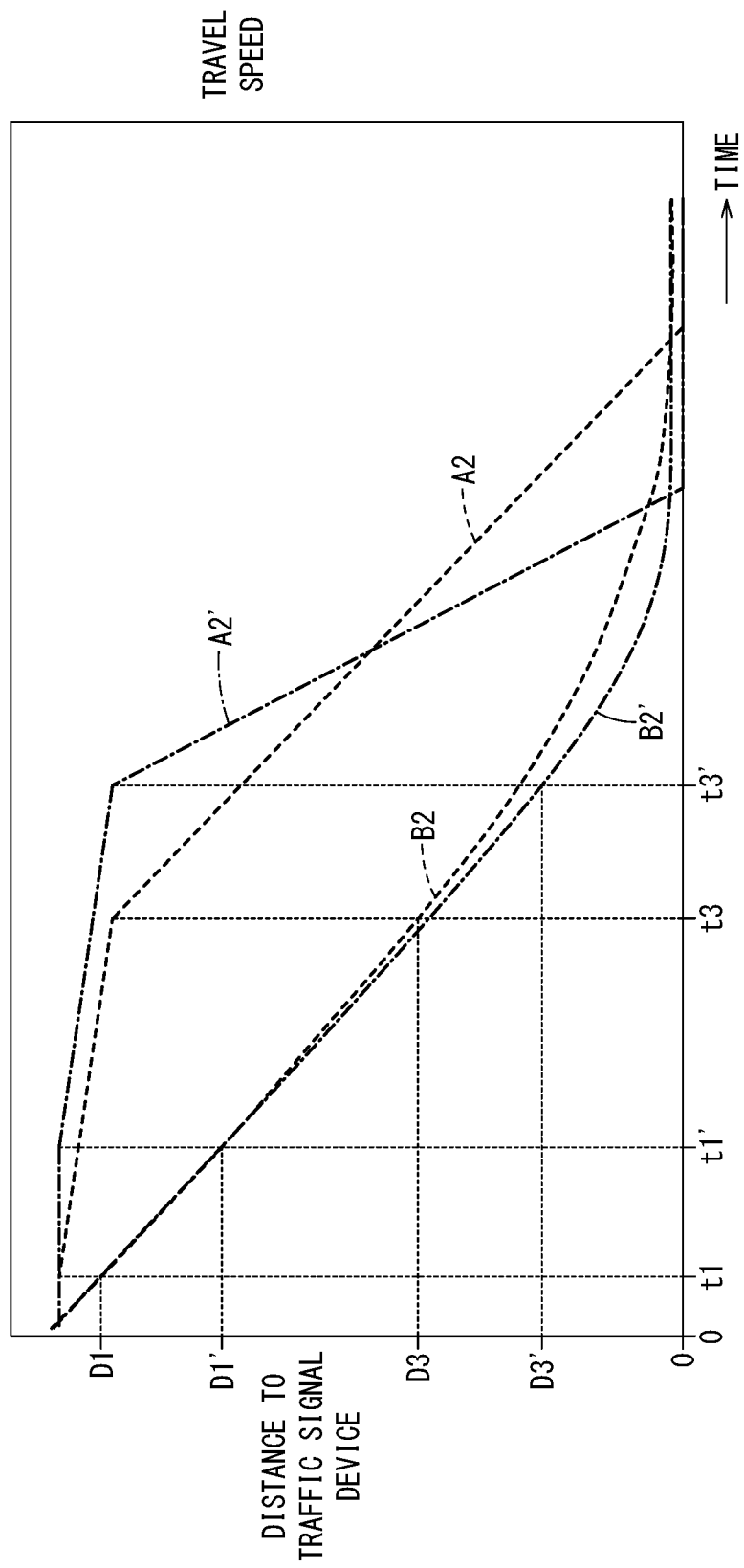
FIG. 8 is a diagram showing a transition of a distance from the host vehicle to a traffic signal device along with the passage of time, and a transition of a travel speed of the host vehicle along with the passage of time.

In FIG. 8, the line A2 indicates a transition of the travel speed of the host vehicle 90 along with the passage of time, and the line B2 indicates a transition of the distance between the position of the host vehicle 90 and the position of the traffic signal device 92 along with the passage of time. Moreover, similar to the lines A2 and B2, the lines A2' and B2' indicate transitions in the case that the external environment recognition unit 66 does not recognize the traffic signal.

If a large third rate of deceleration a3 is allowed in the process of step S9 shown in FIG. 4, the first distance D1 can be made shorter. More specifically, the first distance D1 can be set in accordance with the third rate of deceleration a3. In the case that the first distance D1' which is shorter than the first distance D1 is used, the relationship between time and the travel speed becomes as shown by the line A2' shown in FIG. 8.

The host vehicle 90 reaches the first distance D1' (D1'<D1) at the point in time t1', and at this time, the host vehicle 90 initiates a deceleration control at the second rate of deceleration a2. The host vehicle 90 reaches the third distance D3' (D3'<D3) at the point in time t3' while decelerating at the second rate of deceleration a2, and at this time, the host vehicle 90 initiates a deceleration control at the large third rate of deceleration a3. According to such a modification, the host vehicle 90 can delay the timing at which the deceleration control at the second rate of deceleration a2 is initiated, while on the other hand, decelerating at the large third rate of deceleration a3.

By delaying the timing at which the deceleration control at the second rate of deceleration a2 is initiated, the transition from automated driving to manual driving, which is carried out when the traffic signal device 92 cannot be recognized, can be waited (postponed) for a long time in a state in which the influence on the vehicle behavior is small (a state in which the rate of deceleration is small).

4.2. Second Modification

The operation determination unit 78 may cancel the deceleration control currently being executed, in the case that an operation intention or a monitoring intention of the vehicle occupant is detected on the basis of a signal output from the operation sensors 24.

4.3. Third Modification

In the process shown in FIG. 4, only the warning (step S6) may be performed, without necessarily performing steps S3 to S5 and steps S7 to S11.

4.4. Fourth Modification

In the above-described embodiment, it is assumed that the rate of deceleration is constant in each of the respective deceleration controls. However, the deceleration may vary along with the passage of time. For example, at the start of the deceleration control, the deceleration may be performed at a small rate of deceleration, and the rate of deceleration may become larger along with the passage of time. Conversely, at the start of the deceleration control, the deceleration may be performed at a large rate of deceleration, and the rate of deceleration may become smaller along with the passage of time.

4.5. Fifth Modification

In the above-described embodiment, at the timing of step S6, the operation determination unit 78 determines to issue a warning in order to notify the vehicle occupant that the traffic signal cannot be identified. However, the operation determination unit 78 may determine to issue a warning at a timing that occurs after step S6. For example, the operation determination unit 78 may determine to issue the warning at any timing that occurs between step S7 and step S8, between step S8 and step S9, between step S9 and step S10, between step S10 and step S11, or after step S11.

5. Technical Concepts Obtained from the Embodiment

A description will be given below concerning technical concepts that can be grasped from the above-described embodiment.

The vehicle control device 10 according to the first aspect of the invention comprises:

the external environment recognition unit 66 which recognizes, on the basis of the map information, the existence of the traffic signal device 92 in the direction of progress of the host vehicle 90, and recognizes the traffic signal displayed by the traffic signal device 92 on the basis of information acquired by the external environment sensors 14 or the communication unit 20;

the distance detection unit 76 that detects the distance between the host vehicle 90 and the traffic signal device 92;

the operation determination unit 78 that determines an operation of the host vehicle 90 on the basis of the recognition result of the external environment recognition unit 66 and the detection result of the distance detection unit 76; and the vehicle control unit 72 that controls the host vehicle 90 on the basis of the operation determined by the operation determination unit 78, wherein:

in the case that the external environment recognition unit 66 recognizes the traffic signal indicating a stop instruction at a point in time t1 (including t1') when the distance detection unit 76 has detected that the distance is less than or equal to the first distance D1 (including D1'), the operation determination unit 78 performs the deceleration control at the first rate of deceleration a1 at the point in time t2 when the distance detection unit 76 has detected that the distance is less than or equal to the second distance D2 which is shorter than the first distance D1; and in the case that the external environment recognition unit 66 does not recognize the traffic signal at the point in time t1 when the distance detection unit 76 has detected that the distance is less than or equal to the first distance D1, the operation determination unit 78 performs the deceleration control at the second rate of deceleration a2, which is smaller than the first rate of deceleration a1, at the point in time t1 when the distance detection unit 76 has detected that the distance is less than or equal to the first distance D1.

In accordance with the above-described configuration, when the traffic signal cannot be recognized in spite of the existence of the traffic signal device 92, it is possible to be made aware of such a state in which the traffic signal cannot be recognized. Further, when made aware of the state in which the traffic signal cannot be recognized, since the deceleration control of the host vehicle 90 is started irrespective of the cause, there is no need to perform a process of identifying the cause of the inability to recognize the traffic signal. Therefore, unrecognizable states of all kinds can be handled with a simple configuration.

In the aspect of the invention:

the operation determination unit 78 may perform the deceleration control at the third rate of deceleration a3 which is greater than or equal to the first rate of deceleration a1, at the point in time t3 (including t3') when the distance detection unit 76 has detected that the distance is less than or equal to the third distance D3 (including D3') while the deceleration control at the second rate of deceleration a2 is being executed; and the third distance D3 may be a distance allowing the host vehicle to stop at the position of the traffic signal device 92 in the case that the deceleration control at the third rate of deceleration a3 is initiated.

In accordance with the above-described configuration, the deceleration control at the second rate of deceleration a2, which is a small rate of deceleration, is performed up to the point of the third distance D3. For example, in the case that it is possible to recognize that the traffic signal permits forward traveling by the time the host vehicle 90 reaches the third distance D3, although an acceleration control is performed, at that time, the rate of acceleration can be suppressed. On the other hand, in the case it is possible to recognize that the traffic signal is displaying a stop instruction by the time the host vehicle 90 reaches the third distance D3, the host vehicle 90 can be made to stop at the position of the traffic signal device 92.

In the aspect of the invention, the operation determination unit 78 may perform the deceleration control at the fourth rate of deceleration a4 which is greater than the second rate of deceleration a2 and less than or equal to the first rate of deceleration a1, in the case that the external environment recognition unit 66 recognizes the traffic signal indicating the stop instruction while the deceleration control at the second rate of deceleration a2 is being executed.

In accordance with the above-described configuration, the deceleration control at the fourth rate of deceleration a4, which is greater than the second rate of deceleration a2 and less than or equal to the first rate of deceleration a1, is performed from the deceleration control at the second rate of deceleration a2 that is already being performed. Therefore, without performing excessive deceleration, the host vehicle 90 can be made to stop at the position of the traffic signal device 92.

In the aspect of the invention, the operation determination unit 78 may cancel the deceleration control in the case that, while the deceleration control is being executed, the external environment recognition unit 66 recognizes the traffic signal indicating permission to travel forward.

According to the above-described configuration, it is possible to perform the travel control in accordance with the traffic signal.

In the aspect of the invention, the first distance D1 may be set in accordance with a value of the third rate of deceleration a3.

In accordance with the above-described configuration, the deceleration control can be appropriately performed.

In the aspect of the invention, the first distance D1 may be a limit distance allowing the external environment sensors 14 or the communication unit 20 to acquire information of the traffic signal.

In accordance with the above-described configuration, it is possible to be made aware of the state in which the traffic signal cannot be recognized at a point that is farther away from the traffic signal device 92. Therefore, without performing excessive deceleration, the host vehicle 90 can be made to stop at the position of the traffic signal device 92.

In the aspect of the invention, the first distance D1 may be a distance determined on the basis of a distance allowing the host vehicle to stop at the first rate of deceleration a1.

In the aspect of the invention, the operation determination unit 78 may perform the evacuation control to cause the host vehicle 90 to move to the road shoulder, in the case that the external environment recognition unit 66 does not recognize the traffic signal at a point in time when the distance detection unit 76 has detected the neighboring distance D4 that is set in advance as being in the vicinity of the traffic signal device 92.

In accordance with the above-described configuration, regardless of the type of traffic signal, the host vehicle 90 that is carrying out a deceleration control does not become an obstacle to the flow of traffic.

In the aspect of the invention, the operation determination unit 78 may cancel the deceleration control at the second rate of deceleration a2 in the case that a predetermined operation is performed by a vehicle occupant while the deceleration control at the second rate of deceleration a2 is being executed.

In accordance with the above-described configuration, it is possible to entrust the travel control in front of (before reaching) the traffic signal device 92 to the vehicle occupant.

The vehicle control device 10 according to the second aspect of the invention comprises:

the external environment recognition unit 66 which recognizes, on the basis of the map information, the existence of the traffic signal device 92 in the direction of progress of the host vehicle 90, and recognizes the traffic signal displayed by the traffic signal device 92 on the basis of information acquired by the external environment sensors 14 or the communication unit 20;

the distance detection unit 76 that detects the distance between the host vehicle 90 and the traffic signal device 92;

the operation determination unit 78 that determines an operation of the host vehicle 90 on the basis of the recognition result of the external environment recognition unit 66 and the detection result of the distance detection unit 76; and the notification control unit 74 which performs the notification control on the basis of the operation determined by the operation determination unit 78, wherein the operation determination unit 78 causes the notification control unit 74 to issue a warning, in the case that the external environment recognition unit 66 does not recognize the traffic signal at a point in time when the distance detection unit 76 has detected a predetermined distance (first distance D1).

In accordance with the above-described configuration, when the traffic signal cannot be recognized in spite of the existence of the traffic signal device 92, a notification can be issued to the vehicle occupant that the traffic signal cannot be recognized. At this time, since the vehicle occupant performs driving, there is no need to perform a process of identifying the cause of the inability to recognize the traffic signal. Therefore, unrecognizable states of all kinds can be handled with a simple configuration.

The vehicle control device according to the present invention is not limited to the embodiment described above, and it is a matter of course that various modified or additional configurations could be adopted therein without deviating from the essence and gist of the present invention.

What is claimed is:

1. A vehicle control device comprising:
an external environment recognition unit configured to recognize, on a basis of map information, an existence of a traffic signal device in a direction of progress of a host vehicle, and recognize a traffic signal displayed by the traffic signal device on a basis of information acquired by an external environment sensor or a communication unit;
a distance detection unit configured to detect a distance between the host vehicle and the traffic signal device;
an operation determination unit configured to determine an operation of the host vehicle on a basis of a recognition result of the external environment recognition unit and a detection result of the distance detection unit; and
a vehicle control unit configured to control the host vehicle on a basis of the operation determined by the operation determination unit,
wherein:
in a case that the external environment recognition unit recognizes the traffic signal indicating a stop instruction at a point in time when the distance detection unit has detected that the distance is less than or equal to a first distance, the operation determination unit performs a deceleration control at a first rate of deceleration at a point in time when the distance detection unit has detected that the distance is less than or equal to a second distance which is shorter than the first distance, in a case that the external environment recognition unit does not recognize the traffic signal at the point in time when the distance detection unit has detected that the distance is less than or equal to the first distance, the operation determination unit performs the deceleration control at a second rate of deceleration, which is smaller than the first rate of deceleration, at the point in time when the distance detection unit has detected that the distance is less than or equal to the first distance, and the operation determination unit performs an evacuation control to cause the host vehicle to move to a road shoulder, in a case that the external environment recognition unit does not recognize the traffic signal at a point in time when the distance detection unit has detected a neighboring distance that is set in advance as being in a vicinity of the traffic signal device.

2. The vehicle control device according to claim 1, wherein:

the operation determination unit performs the deceleration control at a third rate of deceleration which is greater than or equal to the first rate of deceleration, at a point in time when the distance detection unit has detected that the distance is less than or equal to a third distance while the deceleration control at the second rate of deceleration is being executed; and the third distance is a distance allowing the host vehicle to stop at a position of the traffic signal device in a case that the deceleration control at the third rate of deceleration is initiated.

3. The vehicle control device according to claim 2, wherein the first distance is set in accordance with a value of the third rate of deceleration.

4. The vehicle control device according to claim 1, wherein the operation determination unit performs the deceleration control at a fourth rate of deceleration which is greater than the second rate of deceleration and less than or equal to the first rate of deceleration, in a case that the external environment recognition unit recognizes the traffic signal indicating the stop instruction while the deceleration control at the second rate of deceleration is being executed.

5. The vehicle control device according to claim 1, wherein the operation determination unit cancels the deceleration control in a case that, while the deceleration control is being executed, the external environment recognition unit recognizes the traffic signal indicating permission to travel forward.

6. The vehicle control device according to claim 1, wherein the first distance is a limit distance allowing the external environment sensor or the communication unit to acquire information of the traffic signal.

7. The vehicle control device according to claim 1, wherein the first distance is a distance determined on a basis of a distance allowing the host vehicle to stop at the first rate of deceleration.

8. The vehicle control device according to claim 1, wherein the operation determination unit cancels the deceleration control at the second rate of deceleration in a case that a predetermined operation is performed by a vehicle occupant while the deceleration control at the second rate of deceleration is being executed.

9. The vehicle control device according to claim 1, further comprising:

a notification control unit configured to perform a notification control on a basis of the operation determined by the operation determination unit, wherein the operation determination unit causes the notification control unit to issue a warning, in a case that the external environment recognition unit does not recognize the traffic signal at a point in time when the distance detection unit has detected the first distance.

\* \* \* \* \*